United States Patent [19]

Krepak

[11] Patent Number: 5,167,384
[45] Date of Patent: Dec. 1, 1992

[54] INCREASING LIFT ON HELICOPTER ROTOR BLADES AND AIRCRAFT PROPELLORS

[76] Inventor: John C. Krepak, 1024 Prospect St., Shreveport, La. 71104

[21] Appl. No.: 653,499

[22] Filed: Feb. 8, 1991

[51] Int. Cl.⁵ .............................................. B64C 27/10
[52] U.S. Cl. .............................. 244/17.21; 244/23 C; 416/128
[58] Field of Search ............... 244/17.21, 17.19, 17.23, 244/21, 23 C; 416/128; 415/66

[56] References Cited

U.S. PATENT DOCUMENTS

| | | | |
|---|---|---|---|
| 1,056,288 | 3/1913 | MacIntosh | 416/128 |
| 2,835,332 | 5/1958 | Fry | 416/128 |
| 3,054,578 | 9/1962 | Brocard | 244/23 C |
| 3,127,093 | 3/1964 | Sudrow | 416/128 X |
| 3,477,168 | 11/1969 | Trodglen, Jr. | 244/23 C X |
| 3,606,209 | 9/1971 | Rosta et al. | 244/23 C X |
| 3,677,503 | 7/1972 | Freeman, Jr. | 244/23 C |
| 4,913,376 | 4/1990 | Black | 244/17.23 X |

Primary Examiner—Charles A. Marmor
Assistant Examiner—Carla Mattrix
Attorney, Agent, or Firm—Ross, Howison, Clapp and Korn

[57] ABSTRACT

A rotary airscrew having a central hub with coaxial first and second counter-rotating drive shafts, a first set of a plurality of non-lift blades connected to the first drive shaft for rotation to be rotated for moving air therewith, a second set of a plurality of primary airfoil blades connected to the second drive shaft, to be rotated counter to the rotation direction of the plurality of non-lift blades, and spaced apart from the non-lift blades with a small clearance distance to allow non-contacting counter-rotation, and a ring for supporting the first and second sets of blades with a small clearance distance between the ends as they are rotated.

5 Claims, 3 Drawing Sheets

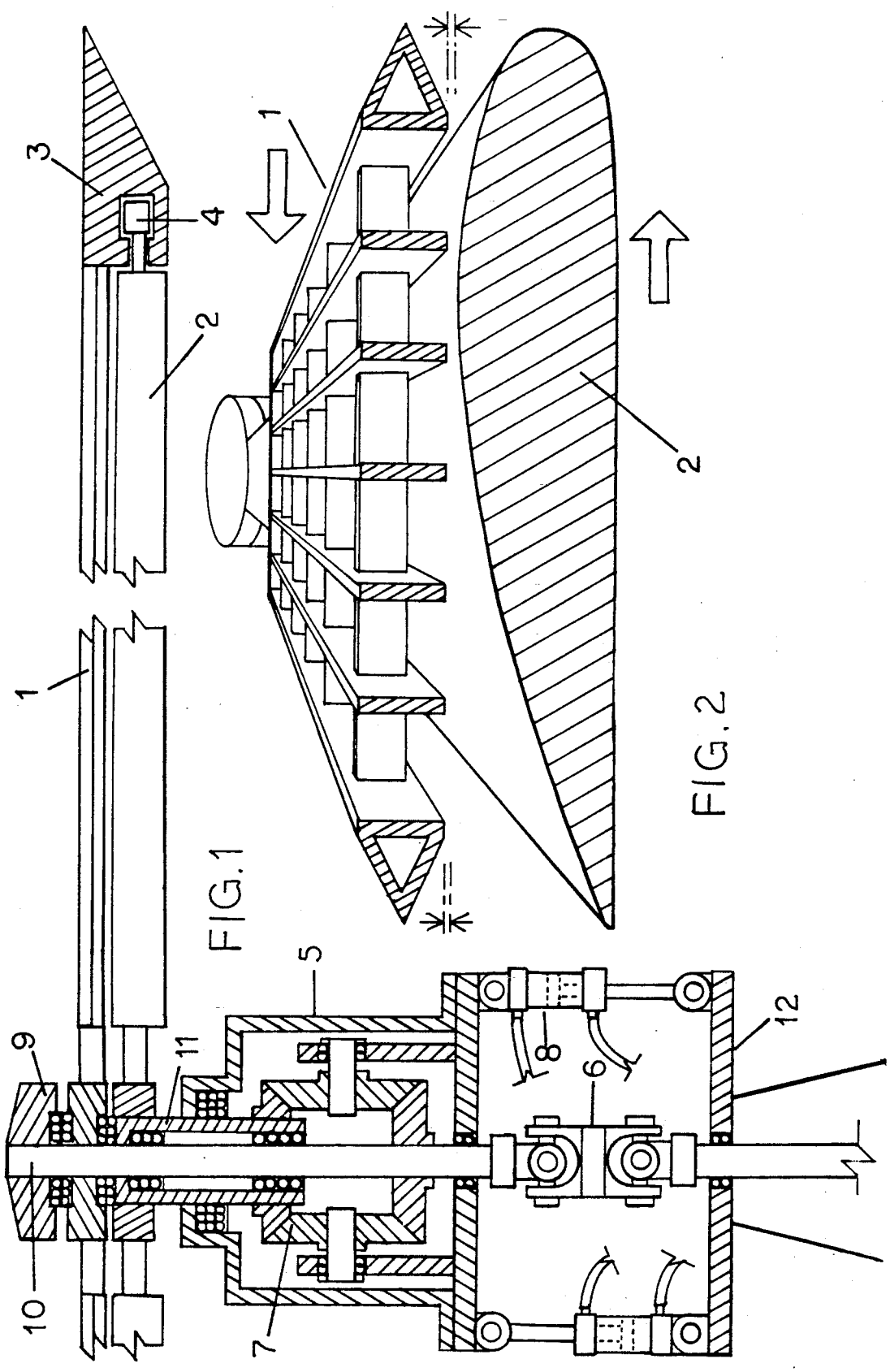

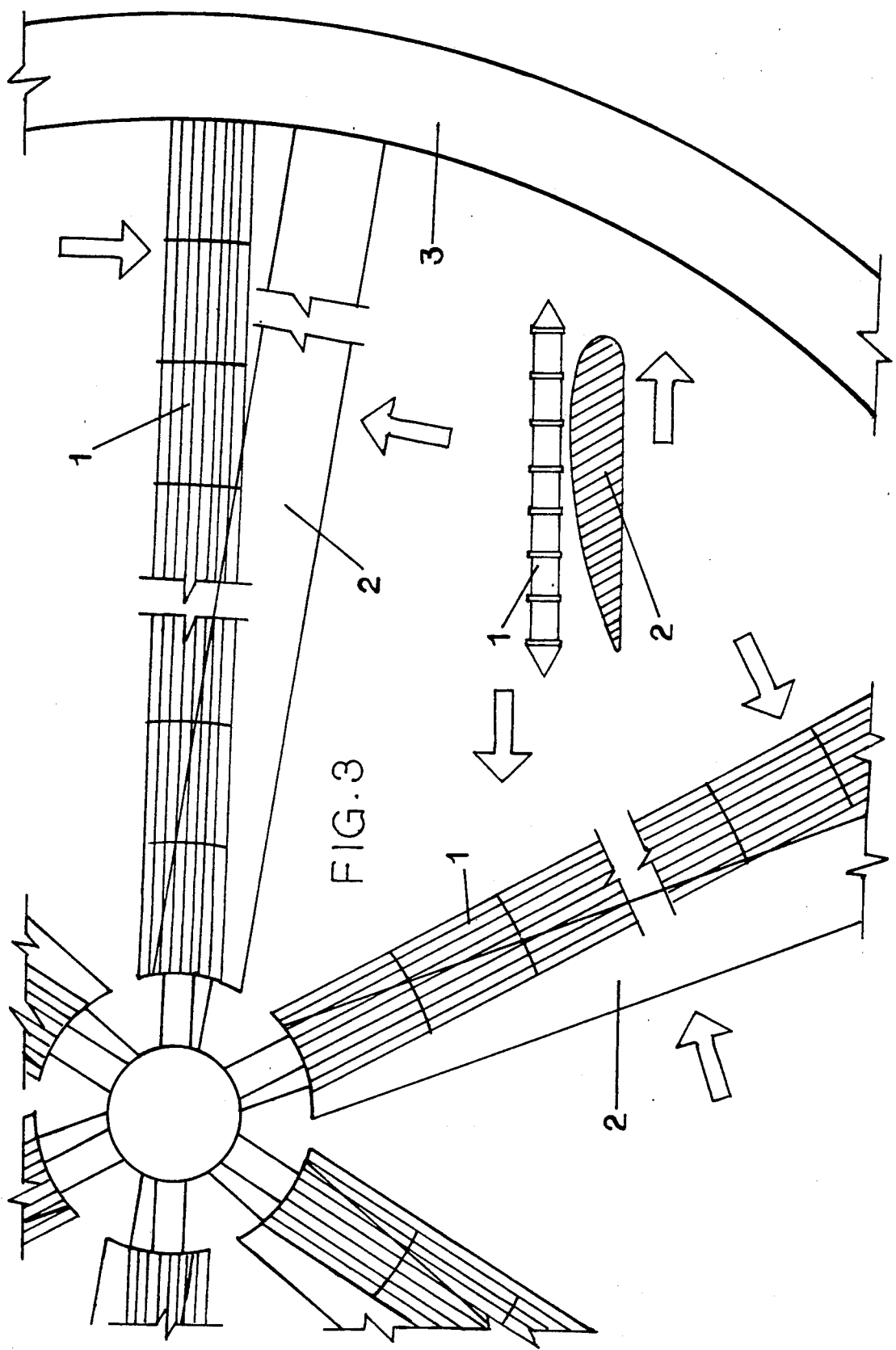

INCREASING LIFT ON HELICOPTER ROTOR BLADES AND AIRCRAFT PROPELLORS

TECHNICAL FIELD OF THE INVENTION

This invention deals with rotors or airscrews with a plurality of blades as used in helicopters and airplanes.

BACKGROUND OF THE INVENTION

At the present time counter-rotating airscrews are designed to operate as separate, distinct units with a space between them, either one just in front of the other or one above the other. This present arrangement depends on the lift from each set of blades acting independently to power the helicopters or propeller driven aircraft. None of the previously issued patents attempt to use counter-rotating blades for the expressed sole purpose of using the passing velocities combined to accelerate the velocity of the airstream over the primary lift airfoil to increase lift. None of them use a non-lift plurality of blades whose sole purpose is the acceleration of the airstream over the upper surface of the lower set of primary airfoils.

Fry, U.S. Pat. No. 3,835,332 uses counter-rotators acting as independent units with a ring attached to the upper blades 10. Neither set of blades contributes to the velocity of the airstream passing over the upper surface of each independent airfoil. The vertical sides of the ring 12 would create unnecessary drag and impede the velocity of the helicopter which basically moves in a "horizontal free-fall." Neither Fry, U.S. Pat. No. 3,870,847 or MacIntosh, U.S. Pat. No. 1,056,288 use a ring with venturi properties to accelerate airflow for airplane propeller use. Sudrow, U.S. Pat. No. 3,127,093 shows his counter-rotating ring supported by four struts 18, that create drag. His ring 12 would create this drag during the horizontal flight of the helicopter. His counter-rotating blades do not add increased velocity to the airstream passing over the upper surface of any blades.

Anderson, U.S. Pat. No. 3,424,135 is not an adequate solution. The blades which intersect each other at their trailing edges would destroy the impetus of the airstream flowing across the upper surface of the airfoil where its own inertia carries it down past the trailing edge. The reactive energy of this downward effect would be lost to the airfoil.

Velkoff, U.S. Pat. No. 3,695,780 does not use a counter-rotator in any form. His main concern is with increasing the strength of the blades.

SUMMARY OF THE INVENTION

This invention is an aircraft rotor or airscrew which comprises an inner hub assembly with two sets of a plurality of counter-rotating blades, an outer circular ring or disc permanently connected to the ends of the upper set of counter-rotating non-lift blades, so that the disc or ring rotates with the upper set of blades. The tips of the lower set of primary airfoil blades are fitted with wheel-bearings and counter-rotate in a grooved raceway located on the inside edge of the ring or disc, positioned just below where the tips or ends of the upper set of blades is permanently attached to the inside edge. This serves to keep the underside of the upper set of non-lift blades substantially close to the upper surface of the primary airfoils in the lower set. A gearbox provides the counter-rotation. An option to be used for propeller driven aircraft is also offered.

An object of the invention is to improve the lift capability of the helicopter rotor or airscrew, or the airplane propeller. Since the helicopter when flying horizontally is described as being in a "horizontal free-fall", the horizontal flat ring 3 or disc with its sharp edge and tapered, angled underside adds additional planing surface, while serving to control the distance between the underside of the upper set of non-lift blades and the upper side of the surface of the lower set of primary airfoils so that these two surfaces remain substantially close.

Advantageously, the substantially close spacing between the non-lift blades and airfoils maintains a high velocity undisturbed across the upper surface of the airfoil, so that a smaller angle of attack for the airfoil gives sufficient lift and thereby reduces the occurrence of stall.

A venturi shaped cross-section of the ring is used with counter-rotating aircraft propellers to produce an increase in the velocity of the air flow across the longer distance of the inside of the ring. The same lift forces introduced into the helicopter rotor system would be applied to the propeller driven aircraft.

Another object of this invention is to increase the difference in the velocities of the air stream flowing over the upper surface of the lower set of airfoils versus the velocity of the air stream flowing under the airfoil.

BRIEF DESCRIPTION OF THE DRAWINGS

These and other advantages and objects will be more fully understood with reference to the description and drawings below in which like numerals represent like elements and in which:

FIG. 1 is a schematic drawing depicting the counter-rotating blades, the ring or disc cross-section, the raceway in the ring or disc that regulates the distance between the underside of the upper non-lift blades, and the top of the surface of the lower set of airfoils, the gear box for counter-rotating the blades, the hydraulic units for tilting the entire rotor, and the universal joint that permits the power shaft to operate during the tilting of the rotor;

FIG. 2 reveals the substantially close passage during counter-rotation of the upper non-lift set of blades relative to the upper surface of the primary airfoils;

FIG. 3 is a top view of the non-lift counter-rotating blades attached to the ring or disc as they pass over the lower set of primary airfoils whose ends travel on bearings operating in a grooved raceway on the inside edge of the disc or ring.

DESCRIPTION OF THE PREFERRED EMBODIMENTS OF THE INVENTION

Figure 4:
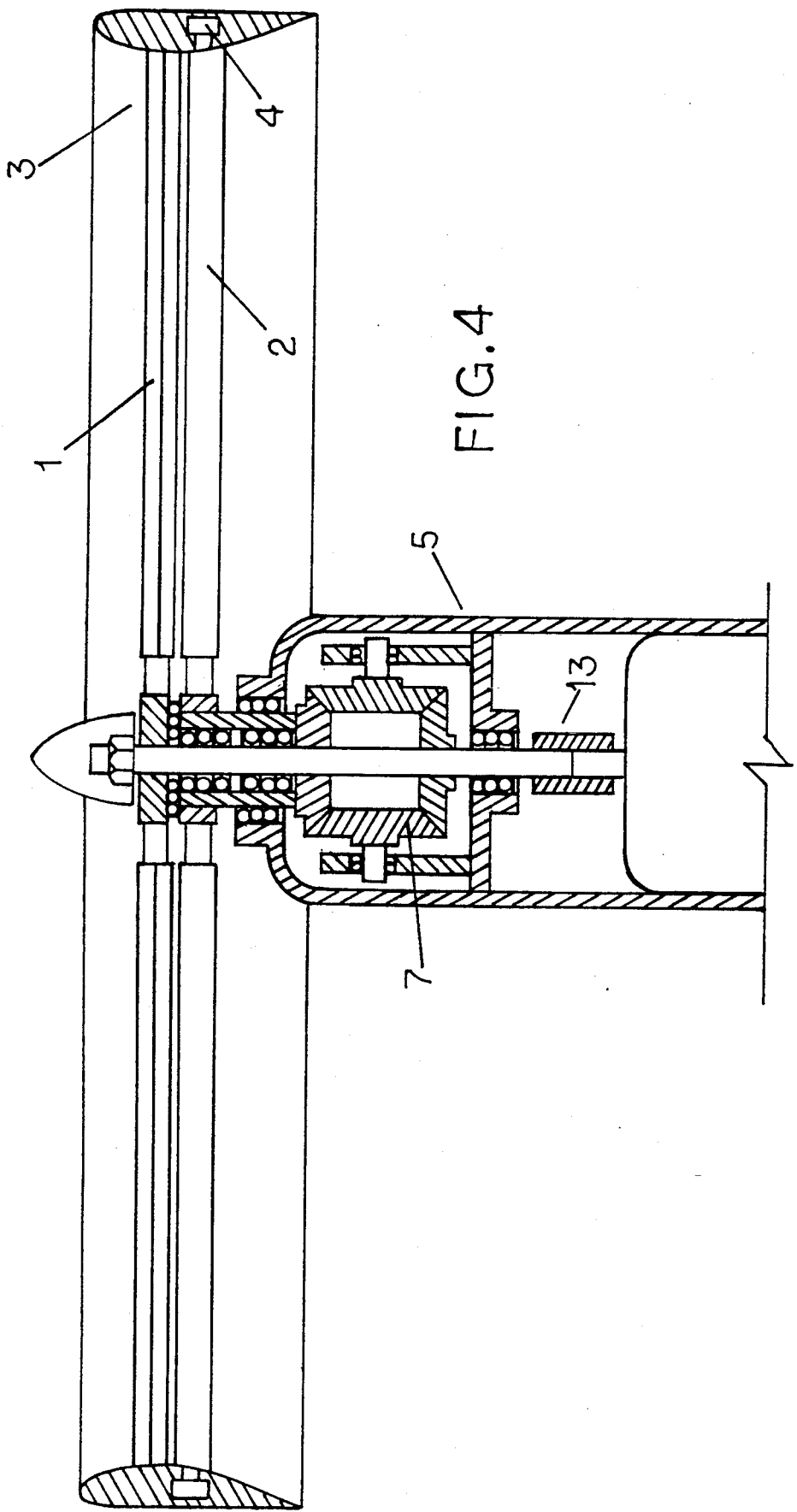
FIG. 4 is a schematic top view of the counter-rotation principle adapted for use in propeller-driven aircraft.

Referring to FIGS. 1 and 2, illustrated is a rotor or airscrew for a helicopter or similar aircraft which comprises a central hub 9, including an inner drive-shaft 10, outer drive-shaft 11, both driven through a gear box 5, to achieve a counter-rotation. Extending outward from the hub 9 are a plurality of blades in two sets 1 and 2. The non-lift blades 1 are driven by the inner drive-shaft 10. The second set of blades 2 or primary airfoils 2 are driven by the outer drive-shaft 11. Both sets are counter-rotated as by the use of four beveled gears in a gear box 5 anchored to the air frame 12. The inner drive-shaft 10 is divided by a universal joint 6 to permit the use of a hydraulic tilt system. The hydraulic pistons 8 of which there are four located to the front and back of the inner drive-shaft and left and right of the inner drive-shaft below the base of the gear box, permit tilting of the entire rotor in any direction with just two hydraulic controls. The plurality of non-lift blades 1 are permanently attached to the inside edge of the ring or disc 3. The plurality of airfoils 2 are positioned to counter-rotate with their upper surfaces substantially close to the underside of the non-lift blades 1. To maintain the substantially close proximity, the ends of airfoil blades 2 are equipped with bearings 4 that counter-rotate in a grooved raceway in the inside edge of the ring or disc, substantially close below where the ring or disc is permanently attached to the non-lift blades 1. The ring or disc 3 has a flat upper surface, a sharp edge and has a tapered angle on its underside. The width of this flat ring or disc 3, with its tapered angle underneath provides additional planing surface during horizontal flight. The tapered angle on the underside of the ring or disc 3 permits the craft to plane on this extra surface when moving horizontally at rapid speeds. The sharp edge can be prepared to cut away any foliage or greenery it touches.

On a helicopter with a 36' diameter rotor system operating at 400 rpm, the average velocity of the blades is 314 mph. An upper set of non-lift blades with 6 or more blades turning at 400 rpm represents 2400 blades passing one point every minute or 40 blades per second. The counter-rotating blades in the lower set are airfoils, which also travel at 314 mph. The combined passing velocities are 800 rpm or 628 mph. The non-lift blades and counter-rotating airfoils pass substantially close to each other to produce a net increase in relative velocity of air over the upper surface of the primary airfoils. The increased relative velocity of the air over the upper airfoil surfaces reduces the average pressure over these surfaces and thereby increases the lift. Eight hundred rpm (800 rpm) is equal to 80 times per second.

In the construction disclosed it is possible for the passing velocities to be combined to increase the lift over the upper surface of the airfoil. Engineering calculations as set forth in the following equations and graphs support my invention:

Power Required for Helicopter Lift

The horsepower required to generate lift is given by $$P = C_p \frac{LV}{550} \tag{1}$$

where
P = Horsepower
$C_p$ = Power coefficient
L = Lift in LBF (Pounds Force)
V = Airflow velocity through the disc in FPS (feet per second)

The lift is expressed as $$L = \tfrac{1}{2} \rho A V^2 \tag{2}$$

where
$\rho$ = Freestream density
A = Flow area
Combine these two equations $$P = C_p \frac{\rho A V^3}{1100} \tag{3}$$

Solving for velocity $$V = \left( \frac{1100 P}{C_p \rho A} \right)^{\tfrac{1}{3}} \tag{4}$$

Let P' be a new power level. The change in lift becomes $$\frac{\Delta L}{L} = \left( \frac{V'}{V} \right)^2 - 1 \tag{5}$$

This is the increase in lift. Due to an increase in power (P'−P) to the rotor.

$$\Delta \frac{L}{L} = \left( \frac{P'}{P} \right)^{\tfrac{2}{3}} - 1 \tag{6}$$

where V' = New airflow velocity through the disc
In terms of the new lift, L'

$$\frac{L'}{L} = \left( \frac{P'}{P} \right)^{\tfrac{2}{3}} \tag{7}$$

Thus, the lift ratio is equal to the power ratio to the two-thirds power.

Dependence of Airfoil Lift on the Velocity Distribution

The lift of an airfoil can be calculated from the pressure distribution over the surface as given by the following expression for lift coefficient.

$$C_L = \frac{\cos \alpha}{\tfrac{1}{2} \rho_\infty V_\infty^2 C} \left\{ \int_{EL}^{ET} P_L \, dc - \int_{EL}^{ET} P_u \, dc \right\} \tag{8}$$

where $$C_L = \frac{L}{\tfrac{1}{2} \rho_\infty V_\infty^2 C} = \text{airfoil section lift coefficient}$$

L = Lift per unit span
$\rho_\infty$ = Freestream density
$V_\infty$ = Freestream velocity
C = Airfoil chord
$\alpha$ = ∠ of attack
$P_L$ = Pressure on lower surface
$P_u$ = Pressure on upper surface
EL = Leading Edge
ET = Trailing Edge Written in terms of pressure coefficient, this becomes $$C_L = \frac{\cos \alpha}{C} \int_{EL}^{ET} (C_{pL} - C_{pu}) \, dc \tag{9}$$

where $$C_{pL} = \frac{P_L - P_\infty}{\frac{1}{2}\rho_\infty V_\infty^2}$$

$$C_{Pu} = \frac{P_u - P_\infty}{\frac{1}{2}\rho_\infty V_\infty^2}$$

$P_\infty$ = Freestream pressure

For incompressible flow, the pressure coefficient can be expressed as $$C_p = \left[ 1 - \left( \frac{V}{V_\infty} \right)^2 \right] \tag{10}$$

where V = Local velocity on the airfoil outside of the boundary layer. The section lift coefficient becomes $$C_L = \frac{\cos \alpha}{C} \int_{EL}^{ET} \left[ \left( \frac{V_u}{V_\infty} \right)^2 - \left( \frac{V_L}{V_\infty} \right)^2 \right] dc \tag{11}$$

where
$V_u$ = Local velocity on the upper surface
$V_L$ = Local velocity on the lower surface
Expressed in terms of average velocities $$C_L = \cos\alpha \left[ \left( \frac{\overline{V_u}}{V_\infty} \right)^2 - \left( \frac{\overline{V_L}}{V_\infty} \right)^2 \right] \tag{12}$$

Where the bar over the square of the velocity ratio indicates the average over the chord length.
Expressed in terms of lift per unit span $$L = \tfrac{1}{2}\rho_\infty C \cos\alpha (\overline{V_u}^2 - \overline{V_L}^2) \tag{13}$$

The total lift is obtained by integrating this expression over the wing or blade span.

This equation shows that the lift is proportional to the difference between the averages of the square of the velocity on the upper surface and the square of the velocity on the lower surface.

Influence of Upper Surface Velocity Perturbation On Airfoil Lift

From the last equation, the change in lift due to an upper surface velocity perturbation is $$\frac{\Delta L}{L} = \frac{\overline{V_u^{2'}} - \overline{V_u^2}}{\overline{V_u^2} - \overline{V_L^2}} = \frac{\frac{\overline{V_u^{2'}}}{\overline{V_u^2}} - 1}{1 - \frac{\overline{V_L^2}}{\overline{V_u^2}}} \tag{14}$$

From previous results $$\frac{\overline{V_L^2}}{\overline{V_u^2}} \approx \frac{C_{pL} - 1}{C_{Pu} - 1} \tag{15}$$

where $\overline{V_u^{2'}}$ = new average of upper surface velocity squared

The ratio $V_L^2/V_u^2$ varies from approximately $\frac{1}{3}$ at high lift airfoil to zero lift for a standard symmetrical non-lift blade. A typical value at moderate lift is $\frac{2}{3}$.

Thus, $$\frac{\Delta L}{L} \approx 3 \left( \frac{\overline{V_u^{2'}}}{\overline{V_u^2}} - 1 \right) \tag{16}$$

Thus, the increase in lift is a strong function of the perturbation velocity. For example, a 5 percent increase in upper surface velocity would give about a 31 percent increase in lift, and a 10 percent increase in upper surface velocity would give about a 63 percent increase in lift.

This may be related to the power ratio since $$V \propto P^{\frac{1}{3}} \tag{17}$$

so that $$\frac{\overline{V_u^{2'}}}{\overline{V_u^2}} = \left( \frac{P'}{P} \right)^{\frac{2}{3}} \tag{18}$$

and $$\frac{\Delta L}{L} \approx 3 \left[ \left( \frac{P'}{P} \right)^{\frac{2}{3}} - 1 \right] \tag{19}$$

This is the potential increase in lift of the bottom airfoil due to the increased velocity over its upper surface form the wake defect of the upper non-lift blade when the added power (P'−P) is applied to the upper non-lift blade.

Comparing the increase in lift obtained from applying the extra power (P'−P) to the upper non-lift blade with that obtained by applying this same extra power to the bottom airfoil alone.

$$\frac{\Delta L_u}{\Delta L_L} = 3 \tag{20}$$

This suggests that the wake perturbation method is potentially three (3) times more effective in transferring momentum to the airflow through the disc than is the primary airfoil.

To check this, it is necessary to evaluate the potential magnitude of velocity perturbation that can be obtained by the counter-rotating blades. This is done in the next section.

Velocity Perturbation in the Wake of the Upper Non-Lift Blade

The increase in velocity over the bottom airfoil is created by the velocity defect in the wake of the upper non-lift blade. The maximum velocity defect for a turbulent wake is given by $$\frac{\Delta U_{max}}{U} \approx 0.98 \left( \frac{C_d d}{x} \right)^{\frac{1}{2}} \tag{21}$$

For $x > 50 \, C_d d$ where
$\Delta U_{max}$ = Maximum velocity defect which occurs on the centerline
$U$ = Freestream velocity
$C_d$ = Drag coefficient for the upper non-lift blade
$d$ = Maximum thickness of upper non-lift blade x = Distance from trailing edge of upper non-lift blade
The distribution of velocity defect within the wake is given by $$\frac{\Delta u}{\Delta U_{max}} \left[ 1 - \left(\frac{y}{b}\right)^{\frac{3}{2}} \right]^2$$

$$b \approx 0.567 \sqrt{C_d x d}$$

where
$\Delta u$ = Velocity defect as a function of y
y = Coordinate perpendicular to the centerline To obtain the factor of 3 improvement in lift, it is necessary to have a velocity perturbation of 6 percent of the freestream velocity. From the above equations this is found to be a very reasonable average for a standard helicopter hovering condition.

The above comparison made using aeronautical engineering principles indicates added lift due to power input to the upper non-lift blade compared to the added lift obtained if this same power was put into the primary airfoil alone. The result is that the lift increase due to the counter-rotating non-lift blade is potentially three times greater than that obtained from the same power increase to the primary airfoil. The proposed invention is an alternate method for transferring momentum to the airflow through the disc and conforms completely to the conservations of momentum, energy and mass. The concept is valid, useful and unique.

FIG. 2 indicates the substantially close arrangement of the bottom surface of the non-lift blades 1 to the upper surface of the primary airfoil blades 2.

FIG. 3 is a top view of how the plurality of non-lift blades 1 are attached to the ring or disc 3 and how the plurality of primary airfoil blades 2 pass under the non-lift blades while counter-rotating with their ends located in the grooved raceway.

Thus, what has been disclosed is a rotor or airscrew to be used on helicopters and propeller driven aircraft. It consists of two sets of blades that counter-rotate, one set above the other in substantially close proximity to each other. A plurality of non-lifting blades rotate above a plurality of airfoil blades that provide lift. The underside of the upper set of blades is substantially close to, barely missing the upper surface of the lower set of airfoils. The ends of the upper set of non-lifting blades are fastened to the inside of a circular ring or disc so that the ring or disc rotates with the upper non-lift blades. The ends of the lower set of airfoils are equipped with a set of bearings that rotate in the opposite direction in a grooved raceway located in the inside of the ring or disc, just below where the upper set of blade ends is fastened.

None of the previously issued patents attempt to use counter-rotating blades for the express purpose of using the passing velocities to increase the lift on the lower set of blades.

FIG. 4 illustrates the option in the shape of ring 3 wherein a cross-section of the ring indicates a venturi shape to benefit from the increased velocity through the inside of the ring while using the counter-rotating non-lift blades passing in substantially close proximity to the upper or frontal surface of the primary airfoils.

While the invention has been described in connection with preferred embodiments, it is not intended to limit the scope of the invention to the particular form set forth, but on the contrary, it is intended to cover such alternatives, modifications, and equivalents as may be included within the spirit and scope of the invention as defined in the appended claims.

I claim:

1. A rotary airscrew comprising:
   (a) a central hub having coaxial first and second counter-rotating drive shafts;
   (b) a set of a plurality of non-lift blades connected to the first drive shaft to be rotated for moving air therewith;
   (c) a set of a plurality of airfoil blades connected to the second drive shaft to be rotated counter to the rotation of the plurality of non-lift blades and spaced apart from the non-lift blades with a small clearance distance to allow non-contacting counter-rotation; and
   (d) ring means for supporting the non-lift and airfoil sets of blades with the small clearance distance as they are counter-rotated.

2. A rotary airscrew as in claim 1 wherein:
   (a) the set of a plurality of non-lift blades and the set of a plurality of airfoil blades have tips and substantially equal lengths such that during rotation, the tips thereof define a circle of a predetermined diameter; and
   (b) the ring means for supporting the set of non-lift blades and set of airfoil blades is a ring of a diameter greater than the predetermined diameter, which ring spaces the airfoil blades apart from the non-lift blades and maintains a small clearance distance between the non-lift blades and airfoil blades as they are counter-rotated.

3. A rotary airscrew as described in claim 2 wherein the ring means further comprises:
   (a) a ring member fastened to the tips of the non-lift blades for rotation therewith about a blade rotation axis, which ring member has a substantially flat upper surface perpendicular to the blade rotation axis, a sharp outside edge, and a lower surface extending inwardly from the edge at a low angle to support a grooved raceway on an inside edge of the ring; and
   (b) anti-friction bearings affixed to the tips of the airfoil blades, which bearings are sized for travelling in the raceway in counter-rotation with the airfoil blades to thereby axially space the airfoil blade tips from the non-lifting blades while freely permitting counter-rotation.

4. A rotary airscrew as in claim 2 wherein the ring means further comprises:
   (a) a ring member rigidly fastened to the tips of the set of non-lift blades for rotation therewith, which rings member defines a venturi with a streamlined cross-sectional shape in the direction parallel to the axis of rotation such that it increases the velocity of air moving through the venturi in the direction parallel to the axis of rotation;
   (b) a groove defined continuously around the interior edge of the ring; and
   (c) anti-friction bearings attached to the tips of the airfoil blades sized for traveling in the groove and for supporting each of the plurality of airfoil blades spaced apart from each of the plurality of non-lift blades.

5. A rotary airscrew as in claim 1 where each of said plurality of non-lift blades is constructed with openings therethrough in the direction of the axis of rotation such that air which passes vertically through the non-lift blades is moved by the non-lift blades in the direction of rotation thereby increasing the velocity of the air as it passes over the counter-rotating airfoil blades adjacent the non-lift blades, such that the effective velocity of air over the surfaces of the airfoil blades is effectively increased.

* * * * *

UNITED STATES PATENT AND TRADEMARK OFFICE
CERTIFICATE OF CORRECTION

PATENT NO. : 5,167,384
DATED : December 1, 1992
INVENTOR(S) : John C. Krepak

It is certified that error appears in the above-indentified patent and that said Letters Patent is hereby corrected as shown below:

Column 1, line 24, replace "3,835,332" with --2,835,332--.

Column 1, line 32, replace "3,870,847" with --2,870,847--.

Column 1, line 40, replace "3,424,135" with --2,424,135--.

Column 6, line 30, replace "form" with --from--.

Column 7, line 30, replace "conservations" with --conservation--.

Column 8, line 55, replace "rings" with --ring--.

Signed and Sealed this

Twenty-sixth Day of October, 1993

Attest:

BRUCE LEHMAN

*Attesting Officer*   *Commissioner of Patents and Trademarks*